June 5, 1962 W. M. KAHN 3,037,697

INFORMATION HANDLING APPARATUS

Filed June 17, 1959 3 Sheets-Sheet 1

INVENTOR.
WILLIAM M. KAHN

BY Henry L. Hanson

ATTORNEY

INVENTOR.
WILLIAM M. KAHN
BY Henry L. Hanson
ATTORNEY

INVENTOR.
WILLIAM M. KAHN
BY Henry L. Hanson
ATTORNEY

United States Patent Office 3,037,697

Patented June 5, 1962

3,037,697

INFORMATION HANDLING APPARATUS

William M. Kahn, Brighton, Mass., assignor to Minneapolis-Honeywell Regulator Company, Minneapolis, Minn., a corporation of Delaware Filed June 17, 1959, Ser. No. 820,903
9 Claims. (Cl. 235—153)

Figure 1:
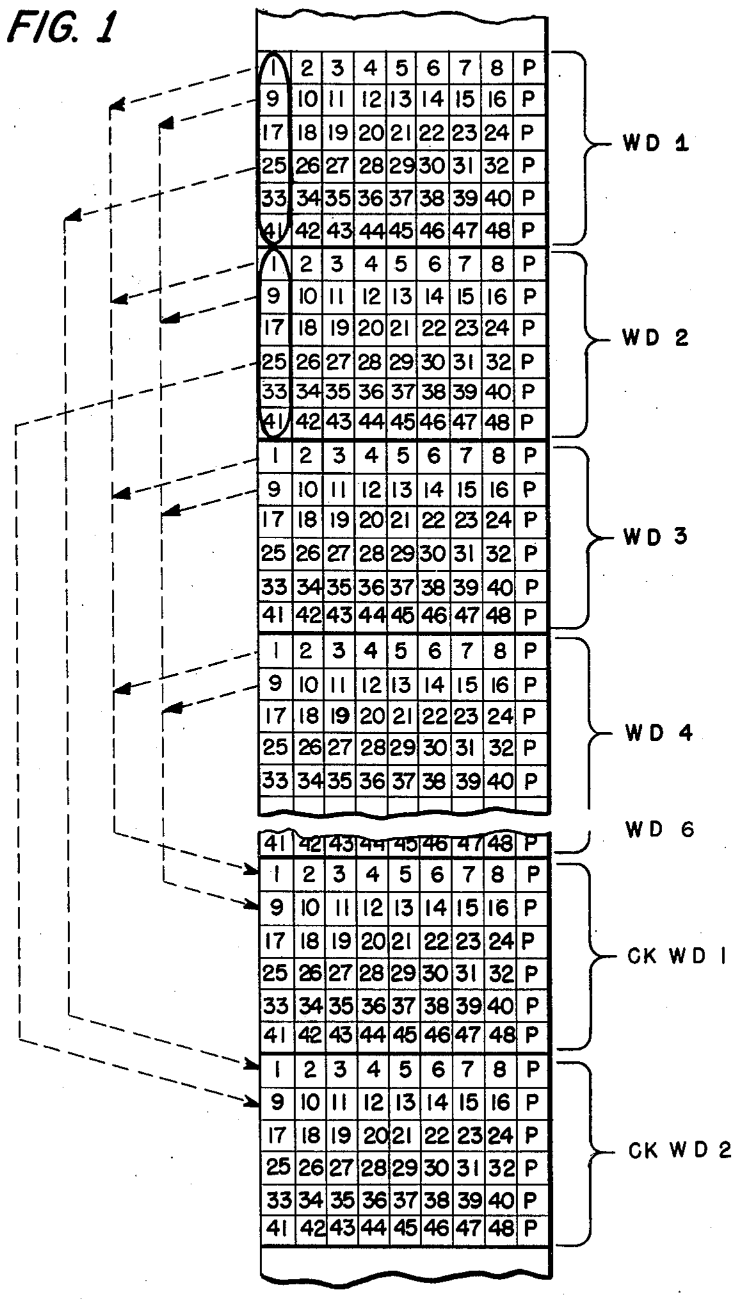

A general object of the present invention is to provide a new and improved apparatus for checking the operation of digital data processing apparatus. More specifically, the present invention is concerned with a new and improved means for producing a checking facility for a data processor where the power of the check has been increased manifold times over checking schemes heretofore known and wherein the checked data is readily adapted for being reconstructed in the event that some of the data may be in error in a subsequent processing operation.

In the processing of digital data, it is essential that the data processed be processed without error or, in the event that an error should occur, it is essential that there be an immediate indication of this fact so that appropriate steps may be taken to either eliminate the error or the effects of the error if the data processing operation is to be continued. In a patent issued to R. M. Bloch bearing Reissue Number 24,447, there is disclosed a checking scheme for data to be processed. As disclosed in this patent, the data is arranged in words of uniform length. That is to say, when the information in the data processing system word is considered, the words are each of uniform length in terms of the number of bits included therein. As taught in the Bloch patent, each system word carries with it a weight count which represents a number generated by adding in accordance with a predetermined modulus the binary bits of a selected bit type in the word. This form of check may be of a simple modulo 2 type, which is sometimes referred to as a parity check. In another form, the bits of the system word may be so arranged that selected bits are weighted in accordance with the binary progression, and a predetermined summing is effected in accordance with a modulus of a higher number.

The particular check number generating scheme adopted will, in part, depend upon the type of data processing equipment with which the checking scheme is utilized. In accordance with the teachings of the present invention, it is intended that the utilization apparatus be of the type which, for example, manipulates the system word in terms of a plurality of frames, each of which has a fixed number of bits therein. Each frame may include therewith a suitable parity bit. When such a word is arranged for recording on a storage tape, the system word will again be considered as a plurality of frames wherein each frame is recorded transversely in a plurality of channels in the storage tape. This recording technique means that any one system word may be a plurality of frames recorded in a plurality of channels across the tape. By providing a parity check pulse for each frame, it is possible to provide a reliable check for each frame. However, this has been found to be insufficient in certain instances and it is desirable to provide a more powerful check.

In accordance with the teachings of the present invention, a check word is developed where a plurality of system words are to be manipulated or recorded in a block of information. This check word is of the same length as the normal system words of which it is composed, and is generated by adding, modulo 2, the corresponding bit locations in each of the words making up the block of information. This check word is then available for recording along with the information and provides a check which may be considered as a longitudinal check on the information in conjunction with and in addition to the transverse check provided by the frame parity bit.

In order to provide an even more powerful check, it has been found desirable in certain instances to provide a second check word. Each frame of data for the said second check wond is generated by adding, modulo 2, all of the bits of a particular word falling within a system word and within a fixed channel. In order for all frames of said second check word to be a function of the block of information, the number of words in the block must be at least equal to or greater than the number of frames normally occurring in the system word.

Once the foregoing check words have been developed and appended to the information being processed, it is possible to provide a very high degree of protection of a data processing record, and to insure that should an error occur, there is a very high probability that the error cannot go undetected whether it be a single error or a multiple-bit error. In addition, the presence of the check words provides a ready medium by which it is possible to reconstruct information found to be in error in accordance with the principles hereinafter set forth.

It is therefore a further more specific object of the present invention to provide a new and improved apparatus for producing a plurality of check words for a block of data processing information wherein that block comprises a plurality of data processing words.

Another more specific object of the present invention is to provide a means whereby a check word for a data processing block of data may be generated by adding, modulo 2, corresponding bit positions of each word and storing the data in the check word on a recording medium with a plurality of channels and frames for each word.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
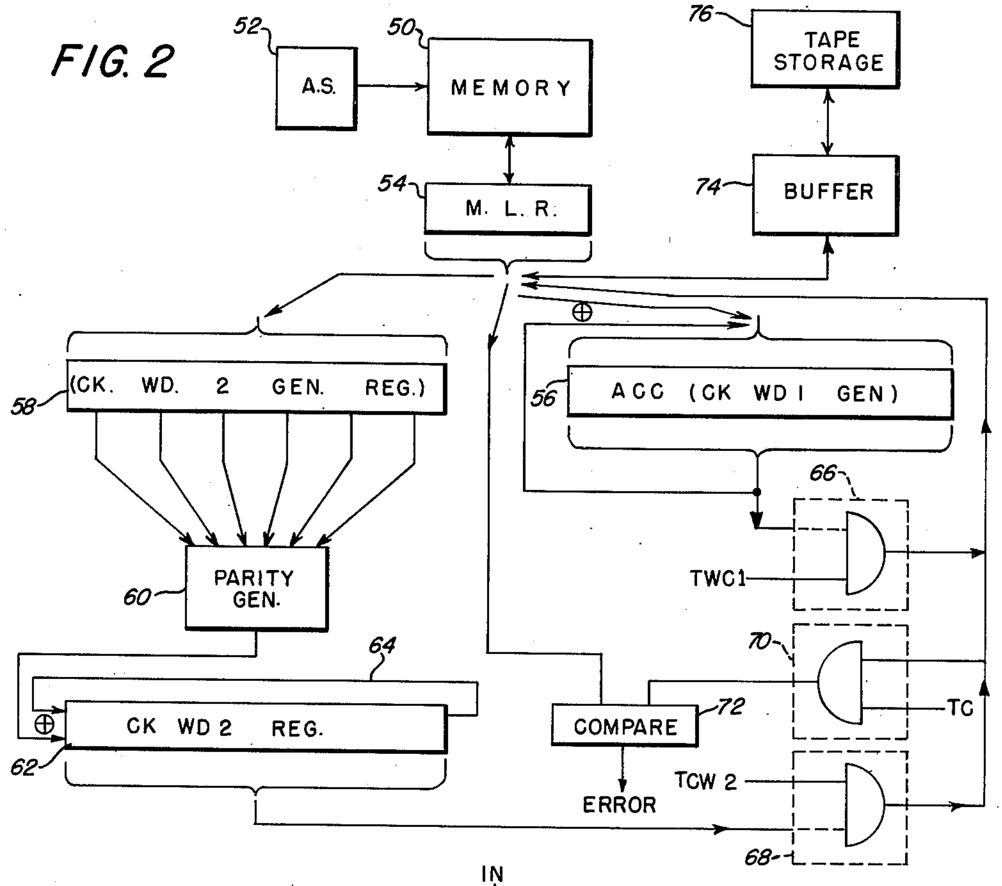
Figure 2A:
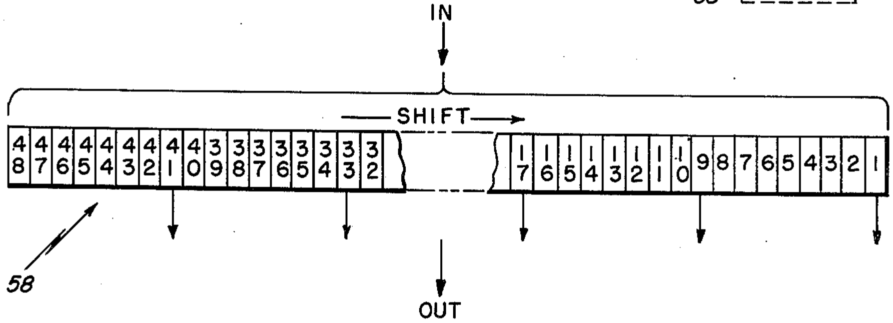
Figure 3:
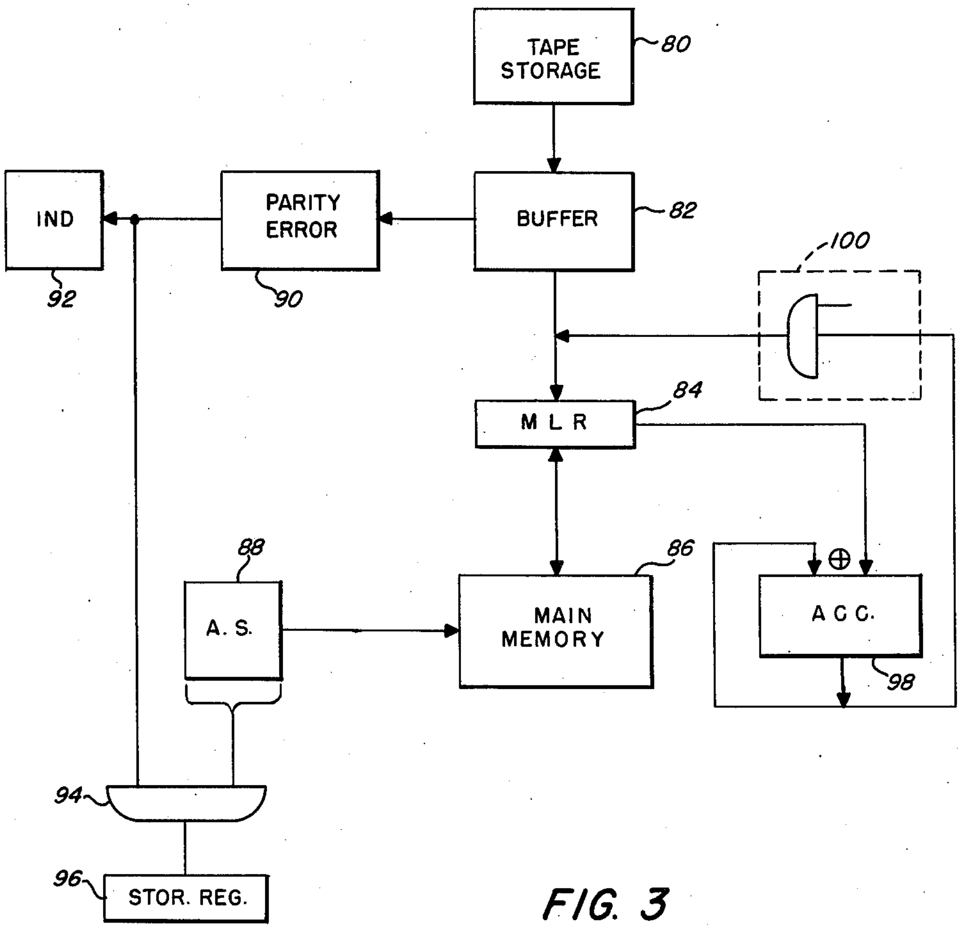

Of the drawings:

FIGURE 1 is a representation of how data may be arranged on a storage tape along with appropriate check words and parity bits for that data;

FIGURE 2 including FIG. 2A is a diagrammatic representation of those elements required for producing the check words used in the apparatus; and FIGURE 3 represents a diagrammatic showing of the apparatus required for restoring the data in error and/or checking for errors.

Referring first to FIGURE 1, there is here illustrated a storage medium such as a record tape of the magnetic or punched variety. The storage tape is one having a plurality of channels extending transversely across the tape and may be prepared either by suitable magnetic recording means in the case of a magnetic tape, or by punching means in the case of a punched paper tape. As illustrated, there are eight informational channels extending across the tape and an additional checking channel which may be referred to as the parity channel.

Recorded along the length of the tape are a plurality of frames of data. For purposes of explanation, it is assumed that a total of forty-eight (48) informational bits define a system data processing word, and that the word will then extend for a total of six (6) frames along the length of the tape. It is assumed in FIGURE 1 that a total of six (6) informational words WD1 through WD6 are recorded in a single informational block. Appender to or immediately adjacent to the six informational words are two (2) check words, CK–WD1 and CK–WD2.

The contents of the check word 1 and the check word 2 are derived from the informational words so as to provide a means for insuring that the appearance of an error in an informational word cannot go undetected.

In order to better understand the apparatus for generating the check words, further reference to FIGURE 1 will indicate the manner in which the individual bits of the check words are related to the data used to derive the check words. The check word CK–WD1 corresponds in bit position to the bits of the words with which it is associated. Thus, the low-order bit No. 1 of the check word CK–WD1 is produced by adding, modulo 2, the corresponding low-order bits of each of the information words of the information block. Thus, the bit 1 of word 1, the bit 1 of word 2, and so on through the bit 1 position of the *n*th word are all added, modulo 2, and the resultant sum is positioned in the first bit position of the check word CK–WD1. Similar modulo 2 adding takes place with respect to all of the other bit positions of the information words, so that the check word CK–WD1 is the result of the modulo 2 sum of each of the corresponding bits of the information words.

The second check word, CK–WD2, is produced in a different manner for the reason that it gives a further variation which extends the power of the checking beyond the check which can be produced by check word CK–WD1. In order to produce the first, or low-order, bit position of the check word CK–WD2, there is a modulo 2 summing of all of the bits of the first information word WD1 falling in the left-hand channel. Thus, there is a modulo 2 summing of the bits in positions 1, 9, 17, 25, 33, and 41. The result of that modulo 2 summing is inserted in the No. 1 position of the check word CK–WD2.

A similar summing is carried out with respect to each of the other words in the block through word 6. In the event that there are more than six words in the block, the process will be repeated so that the corresponding parity bits for word No. 7, for example, will be added, modulo 2, to the first frame data in the check word CK–WD2. Similarly, the eighth word will be added in its channel parities to the second frame on a modulo 2 basis in check word CK–WD2. This process will continue until all of the words of the block have been appropriately added and the longitudinal parities therefor added to the second check word.

Referring to FIGURE 2, there is here illustrated apparatus which may be useful in the generating of the check words discussed above in connection with FIGURE 1. Included with the apparatus may be certain standard components found in most data processing apparatus. Thus, the apparatus in FIGURE 2 may comprise a high-speed storage memory 50 which may take the form of a coincident current memory well known in the art. Suitable address selection circuitry 52 is connected to the memory in order to select the address at which information is to be read from or written into. Connected as a communicating link to the memory 50 is a memory local register 54. This memory local register will take a form which is dependent upon the type of memory utilized with the memory 50. In the case of a coincident current type memory, the memory local register 54 will generally be adapted to receive information in parallel from the memory and transfer this information either serially or in parallel to some other utilization circuit.

Communicating with the memory local register 54 may be an accumulator 56, which, for purposes of the present explanation, may be considered as an accumulator operating in the parallel mode. Also connected to the output of memory local register 54 is a data manipulating register 58, the latter of which is illustrated in greater diagrammatic detail in FIGURE 2A. In FIGURE 2A, it will be noted that this register is adapted to have a parallel input so that data may be inserted into the forty-eight positions corresponding to the forty-eight bits of the data word being processed. Once the data has been inserted by way of a parallel input transfer, it may then be serially shifted and outputs taken in parallel from a pluraltiy of spaced points so that in any one instant, a selected combination of data bits will appear on the output leads for connection to a suitable parity generator 60, illustrated in FIGURE 2.

The output of the parity generator 60 is applied to a check word storage register 62, the latter of which is adapted to receive parity bits generated by the generator 60 and shift the same serially through the register. The register has a feedback means 64 which is connected back to the input of the register wherein feedback data is added, modulo 2, or half-added, with the parity bits coming from the parity generator 60.

The output of the accumulator 56 is adapted to be gated back into the memory local register 54 by suitable gating circuit 66 when the gating circuit is appropriately activated by a programmed timing signal TCW1. Similarly, the output of the register 62 is adapted to be gated into the memory local register 54 by way of a gating circuit 68. This gating circuit may be activated by a program transfer signal TCW2. In addition, a further gating circuit 70 is provided for transferring the outputs of the accumulator 56 and the register 62 to a comparison circuit 72, the latter also being adapted to receive on its input data from the memory local register 54.

The memory local register 54 is also adapted to communicate with a buffer circuit 74, the latter of which is adapted to communicate with a tape storage mechanism 76. The tape storage mechanism may take the form of magnetic tape transport having suitable reading and writing circuits capable of producing a storage record of the type illustrated in FIGURE 1 as the data and check words are supplied thereto from the memory local register.

Considering the operation of the apparatus illustrated in FIGURE 2, the operation may be considered as an automatic programmed operation or as one wherein the control signals utilized are generated manually. An automatically programmed apparatus capable of automatically selecting data by way of address selection circuitry and a core memory, as well as a memory local register, is illustrated in a copending application of Henry W. Schrimpf, Serial Number 636,256, filed January 25, 1957.

For purposes of the present explanation, it is assumed that the address selection circuits 52 for the memory 50 are so arranged that a series of six informational words, such as illustrated in FIGURE 1, are to have two check words generated therefor. The addresses for the words may be sequential addresses within the memory such that a program may be effected for sequentially addressing memory locations so that the words will appear in sequence in the memory local register 54. As soon as the first word is addressed, it will pass from the memory local register into the accumulator 56, as well as the special register 58. When the first word is read into the accumulator, the word will be stored therein in the form in which it is received, since it is assumed that the register was cleared at the start of the check word generating operation. When this first word is received at the special register 58, the bits of the word may be arranged as illustrated in FIGURE 2A. On the outputs of the register, the bits 1, 9, 17, 25, 33, and 41 will appear simultaneously and be applied to the parity generator, where a single bit will be generated in accordance with the modulo 2 sum of the bits in the indicated bit positions. This particular parity bit will correspond to the first bit indicated in check word 2 in FIGURE 1, and will be inserted into the check word register 62.

If the register 62 has been cleared at the outset, the parity bit will be the only bit residing in the register. As soon as the first parity bit is generated, the register 58 will be shifted toward the right so that the next parity bit generated will be in accordance with the modulo 2 sum of the bits 2, 10, 18, 26, 34, and 42. This parity bit will correspond to the second bit position in the check word 2 illustrated in FIGURE 1. A similar shifting will take place within the register 58 until all of the bits have been read out through the parity generator 60 and a full frame of check bits for the check word 2 has been generated.

After the first word has been processed, the second word will be selected from the memory by way of the address selection circuitry 52 and then out through the memory local register 54 to the accumulator 56 and the check word generator register 58. When the second word is inserted in the accumulator 56, the contents of the accumulator are, in effect, recirculated to the input of the register and added, modulo 2, without carry, to the newly incoming word. The word shifted from the memory local register 54 into the register 58 will be manipulated in the same way as the first word in that a second frame of parity bits will be generated in accordance with longitudinal channel bits from the word as illustrated in FIGURE 1.

This process will continue until all the words of a block have been processed. If there are only six words in the block to be recorded and for which the check data is being generated, the check word 2 will involve only the modulo 2 summing of the words, as indicated in FIGURE 1. However, if more than six words are to be processed in a single block, the parity bits generated and stored in the register 62 will be fed back through the feedback line 64 and half-added or summed modulo 2 with the incoming parity bits from the additional words.

As soon as the check word generation has been completed, the register 62 will contain the bits for check word 2, and the accumulator 56 will contain the bits for check word 1. By way of the gating circuitry 66, the check word 1 may be gated out by the transfer check word signal TCW1 to the memory local register, and then inserted into the memory at a location selected by the address selector 52. Similarly, the check word 2 may be gated by way of the gating circuitry 68, activated by the transfer check word signal TCW2, to the memory local register 54 and then the memory 50.

After the data and the check words are stored in the memory 50, the address selection circuitry may then effect an appropriate transfer from the memory 50 to the memory local register 54 to the buffer 74, and thence to the tape storage mechanism 76, where the same may be recorded in the manner illustrated in FIGURE 1. The buffer 74 may contain a frame parity bit generator for producing the parity bit indicated in FIGURE 1.

Once data has been recorded on tape in the manner illustrated in FIGURE 1, it may be read back at some subsequent time. If circuitry of the type illustrated in FIGURE 2 is utilized, the data will come back from the tape storage 76 through the buffer 74 into the memory local register 54 and thence to the memory 50, where the data will be stored a word at a time in accordance with the addresses, which are selected by the address selection circuitry 52. Depending upon the type of apparatus and data processing problem, the data, when once stored in the memory, may be examined to determine if the transfer from storage has been made without error. This operation may be effected by the circuitry illustrated by sequentially feeding the words from the memory through the check word generating circuits such that a second set of check words may be developed in the manner in which the first set of check words were developed, as described above. The originally stored check words transferred with the data to tape may then be compared in a suitable comparison circuit 72 with the words generated on this checking operation, the latter check words being gated into the comparison circuit by way of the gating circuitry 70. In the event that the two check words do not compare, an error indication may be provided by way of the comparison circuitry 72, which indication may serve to stop the data processing operation, or provide a visual indication of an error to an operator.

Depending upon the type of comparison circuit utilized, it is possible to isolate the area wherein an error may have occurred. By isolating the location of an error, the error may be automatically corrected. For example, if the apparatus should determine that there has been an error in the first channel and in word 1, the parity bit 1 in check word 2 will indicate the presence of an error. Further, if it is the seventeenth bit position of word 1 which is in error, the first check word in bit position 17 will also indicate the presence of an error. This will mean that, if this is a single error, the parity bit P in the first word on the frame containing the bit 17 will also indicate an error. By reversing the status of the information bit at bit position 17 and word 1, it will be possible to make a further examination of all of the data and the check words to determine if, by reversing this bit, the error has been corrected. The same reasoning may be extended to multiple-bit errors wherein an entire channel involving all of the bits of a word are in error, or the error condition has been extended to a plurality of channels as well as a plurality of frames. The apparatus may be suitably programmed to detect, as well as to correct or reconstruct, substantially all multiple error combinations that can reasonably be expected to occur in a data processing operation. The ability to correct will be governed by the extent to which programming flexibility is provided in the utilizing apparatus and the ability of the check words to provide the necessary indication to localize the errors which may have occurred.

A less involved error detection and correction scheme is illustrated in FIGURE 3. In this particular scheme, error detection is determined by the frame parity bits, while the correction may be related to the first check word carried with the data.

In FIGURE 3, there is provided a tape storage apparatus 80 which is adapted to feed data therefrom to a buffer 82, the latter of which is connected to a memory local register 84. The memory local register in turn is arranged for coupling data into and out of the main memory of the combination 86. The location of data transferred from the buffer into the memory 86 will be determined by the addresses selected by the selection circuitry 88.

Connected to the buffer 82 is a parity error detection circuit 90, the latter of which may provide a visual error indication by suitable indicating means 92, and also an electrical signal which may be applied to a gating circuit 94. The gating circuit 94 is adapted to feed data, namely, a selected address from the selection circuit 88, into a storage register 96 whenever an error is detected.

Connected to the memory local register is an accumulator 98 of the type which is capable of feeding the output thereof back to the input for half-adding in each bit position. The output of the accumulator 98 is also arranged to be coupled by way of a gating circuit 100 back to the memory local register 84.

Considering the operation of the apparatus illustrated in FIGURE 3, it is first assumed that the data of the associated apparatus has been recorded in the manner illustrated in FIGURE 1, and that the data when transferred from tape storage 80 through the buffer 82 is examined in each parity bit location to determine if a parity error is occurring. In the event that a parity error has occurred, it is desirable to store that fact by recognizing the parity error and providing a record of where that word is stored in the memory. Thus, the occurrence of a parity error in the output of the circuitry 90 will act upon the gate 94 to open the gate so that the address from the selection circuitry 88 may be read into the storage register 96.

After the block of data has been transferred, and an error has been indicated, the operator may take appropriate steps to program a correction. In programming a correction, the operator will transfer all of the words, except the word in error, through the accumulator 98. By adding the check word to all of the data words, except the word in error, the result stored in the accumulator at the end of this operation will be the reconstructed word, or the word which was in error changed into its corrected form. The word may then be gated through the gating circuitry 100 into the address location for that word as determined by the storage register 96. The manner in which this may be effected by way of an automatic program is determined solely by the type and extent of orders available in the data processing equipment.

It will be readily understood that the circuit features of FIGURES 2 and 3 may be combined for both checking and reconstruction purposes.

While, in accordance with the provisions of the statutes, there has been illustrated and described the best forms of the invention known, it will be apparent to those skilled in the art that changes may be made in the apparatus described without departing from the spirit of the invention as set forth in the appended claims, and that in some cases, certain features of the invention may be used to advantage without a corresponding use of other features.

Having now described the invention, what is claimed as new and novel and for which it is desired to secure by Letters Patent is:

1. Apparatus for use in producing checking data for a plurality of multi-bit data processing words of fixed-bit length comprising first means for adding, modulo 2, correspondingly located bits of each word and forming therefrom a first check word having a bit length equal to that of each data processing word, and second means for adding, modulo 2, those bits from each word falling in a preselected bit pattern related to the manner in which the words are adapted to be stored on a storage medium to form a second check word having a bit length equal to that of each data processing word.

2. Apparatus for use in producing checking data for a plurality of multi-bit data processing words of fixed-bit length comprising first means for adding, modulo 2, correspondingly located bits of each word and forming therefrom a first check word having a bit length equal to that of each data processing word, and second means for adding, modulo 2, those bits from each word falling in a preselected bit pattern related to a single channel of storage in a multiple channel and frame record medium to form a single frame for a second check word having a bit length equal to that of each data processing word.

3. Apparatus for use in producing checking data for a plurality of multi-bit data processing words of fixed-bit length, each of which includes a plurality of fixed-bit length frames comprising first means for adding, modulo 2, correspondingly located bits of each word and forming therefrom a first check word having a bit length equal to that of each data processing word, and second means for adding, modulo 2, those bits from each word falling in a preselected bit pattern to form a frame of check data for each word related to the manner in which the words are adapted to be stored on a storage medium, and a register means connected to said second means to store a plurality of frames produced by said means to form a second check word having a bit length equal to that of each data processing word.

4. Apparatus for producing checking data for a block of data including a plurality of multi-bit data processing words of fixed-bit length where the data in each word is to be recorded on a storage medium in a plurality of channels less than the number of bits in the word and in a plurality of fixed-bit length frames comprising means connected to receive each word and add, modulo 2, those bits of each word which are to be recorded in the corresponding channel and frame position to form a check word having a bit length equal to that of the data processing words, and means adapted to transfer the result of the addition to be recorded with said data.

5. Apparatus for producing checking data for a block of data including a plurality of multi-bit data processing words of fixed-bit length where the data in each word is to be recorded on a storage medium in a plurality of fixed-bit length frames, each extending across a plurality of recording channels, comprising first means connected to receive each word and add, modulo 2, those bits which are to be recorded in the corresponding channel and frame position to form a check word having a bit length equal to that of the data processing words, a second means connected to receive each word and produce the modulo 2 sum of all of the bits of each word directed to fall within a given channel, and means adapted to transfer the result of the addition of said first and second means to be recorded with said data.

6. Apparatus for producing checking data for a block of data including a plurality of fixed length data processing words where the data in each word is to be recorded on a storage medium in a plurality of fixed length frames extending across a plurality of recording channels comprising means connected to receive each word and add, modulo 2, those bits which are to be recorded in the corresponding channel and frame position to form a first check word having a length equal to that of the data processing words, a second means connected to receive each word and add, modulo 2, selected bits in each word to form a fixed-length frame for a second check word, a register means connected to said second means to store a plurality of frames which comprise a second check word, and means adapted to transfer the results of the first and second addition to be recorded with said data.

7. In apparatus for producing check data for a block of data including a plurality of fixed-length data words, each of which is adapted to be recorded in a multiple channel storage medium so that each word when recorded occupies a plurality of fixed-length frames, the combination comprising register means connected to receive each word, and modulo 2 adding means connected to said register means to produce the modulo 2 sum of those bits of each word which, when recorded, fall within a single channel and to form a frame of check data for each word wherein each such frame when recorded on the storage medium extends across a plurality of channels, and means storing each of said frames of data to form a check word whose length corresponds to that of said data words.

8. An apparatus for producing check data for a block of data including a plurality of fixed-length data words, each of which is adapted to be recorded in a multiple channel storage medium so that each word when recorded occupies a plurality of fixed-length frames, the combination comprising register means connected to receive each word, and modulo 2 adding means connected to said register means to produce the modulo 2 sum of those bits of each word which, when recorded, fall within a single channel and form a frame of check data for each word wherein each such frame when recorded on the storage medium extends across a plurality of channels, and means storing each of said frames of data to form a check word having a length equal to that of said data words, said last named mens comprising mens for producing the modulo 2 sum of any frames derived from words in excess of the words required to form said check word.

9. An apparatus for producing check data for a block of data including a plurality of fixed-length data words, each of which is adapted to be recorded in a multiple channel storage medium so that each word when recorded occupies a plurality of fixed-length frames, the combination comprising register means connected to receive each word, modulo 2 adding means connected to said register means to produce the modulo 2 sum of those bits of each word which, when recorded, fall within a single channel and form a frame of check data for each word, means storing said frame of data to form a first check word, a second modulo 2 accumulator connected to add, modulo 2, correspondingly located bits of all of the plurality of words of the block to form a second check word, and means transferring said first and second check words with said block of data.

References Cited in the file of this patent

UNITED STATES PATENTS

| | | |
|---|---|---|
| Re. 23,601 | Hamming et al. | Dec. 23, 1952 |
| 2,977,047 | Block | Mar. 28, 1961 |

OTHER REFERENCES

Richards, R. K.: Arithmetic Operations in Digital Computers (D. Van Nostrand Co., Inc., New Jersey, 1955), pages 187 and 188 relied on.